United States Patent
Blagg

[15] 3,675,947
[45] July 11, 1972

[54] COUPLER-ALIGNING TRAILER HITCH

[72] Inventor: Leon Blagg, Flying X Ranch, P.O. Drawer H, Bertram, Tex. 78605

[22] Filed: Feb. 16, 1971

[21] Appl. No.: 115,374

[52] U.S. Cl. ............................ 280/500, 280/477, 293/69 R
[51] Int. Cl. ............................................................ B60d 1/06
[58] Field of Search .................... 280/500, 477, 505; 293/69

[56] References Cited

UNITED STATES PATENTS

| | | | |
|---|---|---|---|
| 3,420,549 | 1/1969 | Robinson | 280/477 |
| 3,447,826 | 6/1969 | Gostomski | 293/69 |
| 3,580,613 | 5/1971 | Northrop | 280/500 |
| 3,614,136 | 10/1971 | Dent | 280/500 |

*Primary Examiner*—Leo Friaglia
*Attorney*—Ernest R. Archambeau, Jr.

[57] ABSTRACT

In the representative embodiments of the new and improved trailer hitches disclosed herein, a base is secured to the rear of a towing vehicle for carrying an upright coupler ball aligned along a generally-vertical axis. Members are arranged above the base for providing upwardly-facing coupler-supporting surfaces extending outwardly from each side of the coupler ball as well as a rearwardly-facing upright coupler-positioning surface spaced ahead of the vertical axis and inwardly-facing opposed guide surfaces respectively spaced on opposite sides of the vertical axis for cooperatively guiding a trailer coupler downwardly onto the coupler ball after the coupler has been slid across either of the supporting surfaces.

14 Claims, 4 Drawing Figures

PATENTED JUL 11 1972 3,675,947
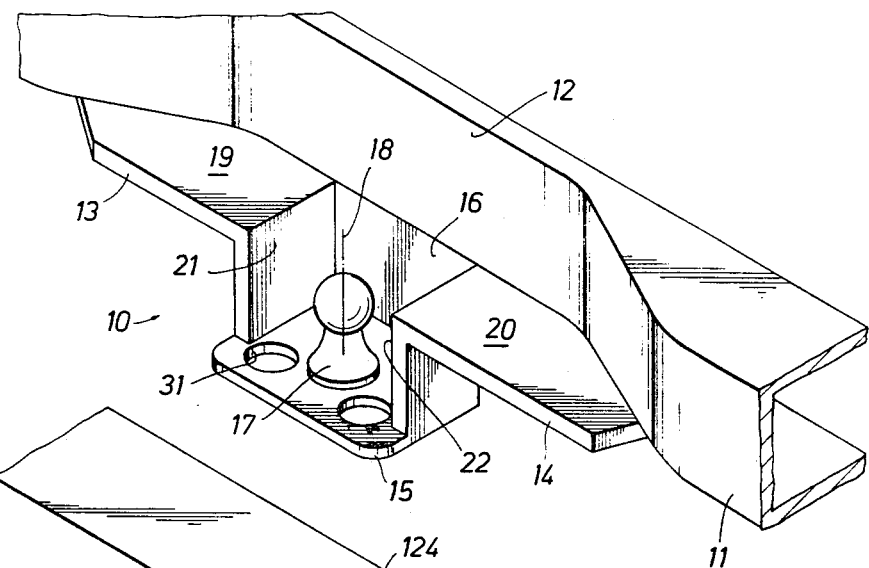
FIG. 1
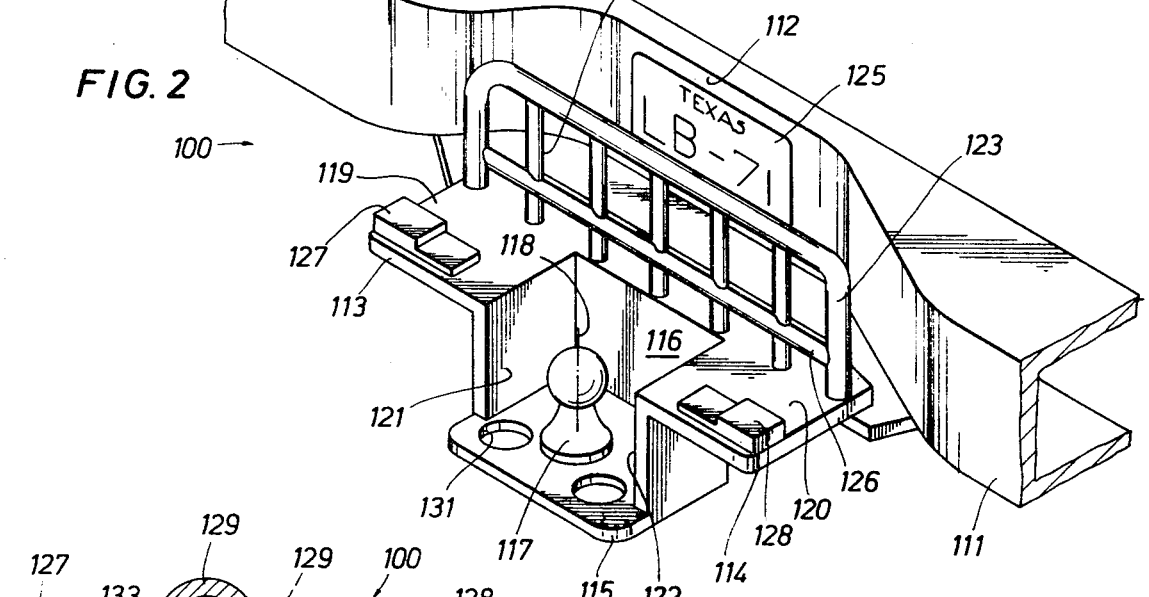
FIG. 2
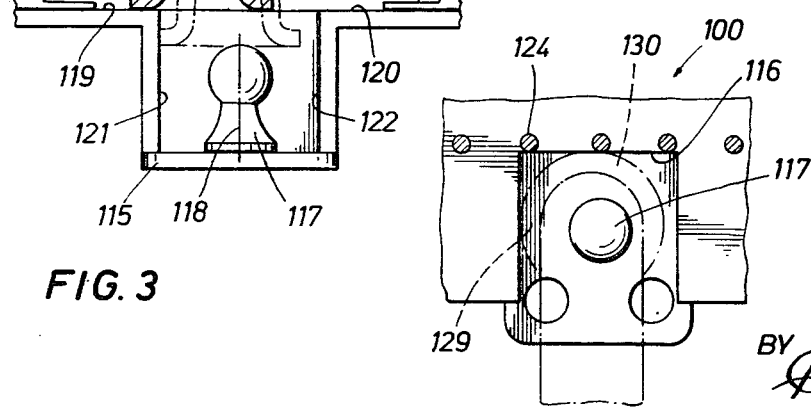
FIG. 3
FIG. 4
Leon Blagg
INVENTOR
BY *J.L. Auchamber Jr.*
ATTORNEY

COUPLER-ALIGNING TRAILER HITCH

In connecting a trailer to a towing vehicle, it is, of course, usually impossible to back the vehicle without the assistance of an observer so as to accurately position the vehicle's coupler ball directly under its mating coupler on the trailer tongue. The problem becomes even more acute where a heavy, large tandem-wheeled trailer is involved since such trailers are so unwieldly that it is difficult, if not physically impossible, to later manually shift the trailer tongue to engage the coupler with the ball. It will be appreciated that attempts to make such corrective movements with a heavy trailer can easily result in injury to an unassisted person.

Accordingly, it is an object of the present invention to provide new and improved vehicular trailer hitches which are particularly adapted for facilitating the coupling of large trailers to a towing vehicle without assistance.

This and other objects of the present invention are attained by arranging a sturdy hitch assembly which is adapted for attachment to a towing vehicle and includes a base on which a coupler ball is to be mounted in an upright position, support means above the base for defining outwardly-extending coupler-supporting surfaces spaced on opposite sides of the coupler ball and no lower than the top of the ball, coupler-positioning means above the outwardly-extending surfaces and spaced forwardly of the coupler ball for locating the nose of a trailer coupler to prevent the coupler ball from being positioned rearwardly of the ball receptacle of the trailer coupler, and coupler-guiding means above the base and between the outwardly-extending surfaces for defining inwardly-facing opposed guide surfaces cooperatively spaced on opposite sides of the coupler ball for guiding the trailer coupler downwardly from the coupler-supporting surfaces onto the coupler ball.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 shows one embodiment of a vehicular trailer hitch assembly arranged in accordance with the principles of the present invention;

FIG. 2 depicts an alternative embodiment of the present invention; and

FIGS. 3 and 4 schematically illustrate the placement of a typical trailer coupler onto a trailer hitch assembly incorporating the principles of the present invention.

Turning now to FIG. 1, a new and improved trailer hitch assembly 10 of the present invention is depicted as it may appear when attached in the usual fashion to the rear bumper 11 of a towing vehicle such as a typical pickup truck (not shown). As is common, the bumper 11 is formed of a stout structural member; and is preferably indented, as at 12, in a symmetrical fashion so as to minimize the distance which the trailer hitch 10 will project behind the towing vehicle. It will, of course, be appreciated that the trailer hitch 10 may be bolted and/or welded to the bumper 11 as well as to the vehicle's frame to assure that the assembly is safely secured to the vehicle.

As illustrated, in the preferred embodiment of the trailer hitch 10 the sturdy assembly is formed of an opposed pair of laterally-spaced structural angles 13 and 14 respectively secured to the underside of the bumper 11 and a generally-horizontal base plate 15 which is located at a convenient elevation above the ground and secured between the depending leg portions of the two angles. An upright plate 16 is secured between the lower edge of the bumper 11 and the forward edge of the base plate 15. As illustrated, the rearward face of the plate 16 is made flush with the bumper indentation 12. A typical trailer coupler ball 17 is mounted in an upright position on the horizontal plate 15 and aligned with a vertical axis 18 located midway between the depending leg portions of the angles 13 and 14 and a selected distance to the rear of the upright plate 16.

It will, of course, be appreciated that the hitch assembly 10 can be best fabricated by welding various types of structural members or plates of steel into a unitary assembly as depicted. If desired, once the assembly 10 is fabricated in this manner, the welded joints can be ground flush to give the assembly a pleasing finished appearance of being a unitary body or even an integral portion of the bumper 11. Alternatively, the hitch 10 can be cast as a unitary assembly in which at least the aforementioned members 13–16 would be integral portions thereof.

Irrespective of the particular manner in which the new and improved hitch assembly 10 is fabricated, it is of particular significance to the present invention that the assembly provides a pair of generally-horizontal coupler-supporting surfaces, as represented by the upper faces 19 and 20 of the laterally-directed legs of the angles 13 and 14, which respectively extend outwardly from each side of the vertical axis 18 and project rearwardly from the rear face of the bumper 11, with these upper faces being at least no lower than the top of the coupler ball 17. Of equal importance, the opposed faces, as at 21 and 22, of the depending leg portions of the structural angles 13 and 14 are spatially disposed from each side of the vertical axis 18 so that at least the upper edges of the opposed faces will define a pair of parallel, opposed guide surfaces which are spaced apart a selected lateral distance and are also at least no lower than the top of the coupler ball 17. Moreover, the spacing between the vertical axis 18 and the exposed rearward faces of the upright plate 16 and the bumper 11 is of significance. The importance of this arrangement of these various members and their respective spacings will subsequently be explained.

Turning now to FIG. 2, a trailer hitch 100 which is also arranged in accordance with the principles of the present invention is depicted. As will be appreciated by a comparison of FIGS. 1 and 2, the trailer hitch assembly 100 is similar in many respects to the trailer hitch assembly 10. Thus, to simplify the description of the trailer hitch 100, the reference numerals employed in FIG. 1 to designate the several elements of the trailer hitch 10 are modified by adding "100" to each of the reference numerals used in FIG. 2 to designate those elements of the hitch 100 which are similar or identical to those used for the hitch 10.

As illustrated, the trailer hitch 100 differs from the trailer hitch 10 in three significant aspects. First of all, the assembly 100 is formed to position the hitch assembly somewhat to the rear of the symmetrical indentation 112 in the vehicle bumper 111. Secondly, the hitch assembly 100 includes a stout grill 123 which is mounted in a generally-upright position and extended laterally a cross the coupler-supporting surfaces 119 and 120 and immediately above the upright plate 116. It will be appreciated that by positioning the grill 123 so that its rearward face is substantially flush with the plate 116, the upright bars 124 thereof will serve as positioning guides for the nose of a trailer coupler as well as act as a guard for protecting a license plate 125 which may be mounted in the bumper indentation 112. In the preferred embodiment of the trailer hitch 100, the grill 123 also includes a horizontal strip or bar, as at 126, which further serves as a coupler-positioning guide and insures that a trailer coupler will not strike the license plate 125.

The third feature which significantly distinguishes the trailer hitch 100 from the trailer hitch 10 is that a pair of opposed stops 127 and 128 are respectively mounted as illustrated on the extremities of the coupler-supporting surfaces 119 and 120 and spaced laterally outwardly from the coupler ball 117. Although the stops 127 and 128 can be arranged to provide only single opposed abutments facing inwardly toward the ball 117, it is preferred that the stops be adapted to respectively provide at least two abutments at different lateral spacings in relation to the coupler ball. Thus, in the preferred embodiment of the trailer hitch 100 illustrated in FIG. 2, the stops 127 and 128 are respectively arranged in a step-like fashion as depicted so as to provide a pair of first opposed abutments respectively located near the mid-point of the surfaces 119 and 120 and a pair of second opposed abutments which are respectively positioned at a greater lateral distance. It will be appreciated, therefore, that the stops 127 and 128 provide one or more pairs of laterally-spaced opposed abutments on the coupler-supporting surfaces 119 and 120 which are spaced outwardly on each side of the guide surfaces 121 and 122 and facing the coupler ball 117.

Turning now to FIGS. 3 and 4, schematic elevational and plan views are shown of the trailer hitch 100 to illustrate the unique cooperative arrangement of both the depicted hitch and the hitch 10 which enable a typical trailer coupler, as at 129, to be reliably guided into position onto the coupler ball 117. It will, of course, be appreciated that except for the cooperatively-arranged stops 127 and 128, the hitches 10 and 100 are functionally equivalent; and, therefore, the forthcoming description of the employment of the hitch 100 will be otherwise true with respect to the hitch 10.

As previously mentioned, it is customary to initially elevate the tongue of a trailer so as to position the coupler 129 at least slightly higher than the top of the coupler ball 117. This, of course, is usually accomplished by means of a typical jack (not shown) which is customarily mounted on the trailer tongue to the rear of the coupler 129. Once the coupler 129 is sufficiently elevated and the trailer's wheels secured to prevent the trailer from rolling, the towing vehicle is backed up to bring the coupler ball 117 into the vicinity of the coupler.

It will be appreciated, therefore, that with the trailer hitch 100 on the vehicle's bumper 111, the towing vehicle can be safely backed until the protective grill 123 contacts the forward end or nose 130 of the coupler 129 for positioning the vehicle longitudinally in relation to the ball receptacle of the coupler. Once the driver realizes that the coupler 129 has engaged the grill 123, towing vehicle is stopped and the driver may now dismount and proceed to coupler the coupler to the ball 117. The indentation 12 in the bumper 11 will serve the same purpose for the hitch 10 for correctly positioning the vehicle.

Experience has shown that the average driver can usually back the towing vehicle with sufficient accuracy to position the nose 130 of the coupler 129 against the grill 123 (or the indentation 12) so as to leave the coupler within a lateral span which is no greater than the lateral spacing between the outer edges of the opposed stops 127 and 128. Thus, if this is the case, the trailer jack is operated to lower the coupler 129 onto the assembly 100 as best illustrated in FIG. 3. The jack is retracted to place the full tongue weight of the trailer onto the hitch assembly 100 so that the coupler 129 can be shifted laterally across either of the coupler-supporting surfaces 119 or 120 toward the opposed guide surfaces 121 or 122 without interference between the ground and the trailer jack. To facilitate sliding movement of the coupler 129 across the coupler-supporting surfaces 119 and 120, one or more holes 131 as shown in FIG. 2 (or at 31 in FIG. 1) are formed in the base plate 115 (or 15) to receive a bar (not shown) which can be used if necessary as a lever to shift the trailer tongue and the coupler 129 toward the coupler ball 117.

Those who have had occasion to use a larger trailer will, of course, appreciate that these trailers — and particularly those with tandem wheels — will tend to resist lateral movements of the tongue by virtue of the frictional engagement of the wheels with the ground. In particular, such trailers tend to cause their tongue to whip back laterally upon removal of a force tending to shift the tongue laterally in the opposite direction toward the coupler ball 117. Accordingly, as a particular feature of the hitch 100, the spaced stops 127 and 128 are cooperatively arranged to prevent any significant retrograde lateral movement of the trailer tongue once the coupler 129 has been positioned between the opposed stops and is resting on either of the coupler-supporting surfaces 119 and 120.

Once the coupler 129 is between the stops 127 and 128, the tongue is moved further laterally to shift the coupler into the space between the guide surfaces 121 and 122. Of particular significance to the present invention, it will be noted from FIG. 3 that the trailer hitch 100 (and the hitch 10 as well) is cooperatively arranged so that the transverse or lateral spacing between the opposed guide surfaces 121 and 122 is such that the leading lateral edge, as at 132, of the coupler 129 is beyond the central axis 118 of the coupler ball 117 before the trailing lateral edge, as at 133, of the coupler has left the coupler-supporting surface 119. Thus, as the coupler 129 falls into the space between the guide surfaces 121 and 122, the coupler will be accurately guided downwardly onto the ball 117 by the cooperation of the upright wall 121 with the trailing edge 133 of the coupler. The same cooperative result will, of course, be realized by the upright wall 122 should the coupler 129 instead be moved from right to left as viewed in FIG. 3. Of equal import, the nose 130 of the coupler 129 is similarly guided by the upright wall 116 to be certain that the coupler is retained in general longitudinal alignment with the ball 117.

Accordingly, it will be appreciated that the present invention has provided new and improved trailer hitches of a unique design which are particularly adapted for facilitating the coupling of large trailers to a towing vehicle without assistance. By placing a coupler ball between and below generally-horizontal coupler-supporting surfaces, a trailer coupler can be easily pushed across these surfaces and fall into the recess. Thereafter, the uniquely-spaced guide surfaces are cooperatively positioned to accurately guide the coupler downwardly onto the coupler ball.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted to be attached on a vehicle for towing a vehicular trailer having a ball coupler of a predetermined maximum lateral width and comprising: base means adapted for carrying a coupler ball in an upright position for mating engagement within the ball receptacle of such a ball coupler; support means defining first and second generally-horizontal coupler-supporting surfaces spaced laterally outwardly on opposite sides of said base means and at a selected elevation no lower than the top of a coupler ball mounted thereon; positioning means defining a rearwardly-facing coupler-positioning surface extending laterally above said coupler-supporting surfaces and spaced ahead of said base means a predetermined distance for cooperatively contacting the nose of such a ball coupler to prevent the ball receptacle thereof from advancing forwardly in relation to a coupler ball mounted on said base means; and guide means above said base means and to the rear of said coupler-positioning surface defining first and second inwardly-facing opposed guide surfaces cooperatively arranged between said coupler-supporting surfaces and laterally spaced from one another a selected distance no less than said predetermined maximum width but no greater than twice said predetermined maximum width for cooperatively guiding such a ball coupler being slidably moved laterally off of one of said coupler-supporting surfaces and downwardly onto a coupler ball mounted on said base means.

2. The apparatus of claim 1 wherein said guide means further define a third guide surface extending downwardly below said coupler-positioning surface toward said base means and cooperatively arranged for guiding the nose of such a ball coupler being moved downwardly onto a coupler ball mounted on said base means.

3. The apparatus of claim 1 wherein said first and second guide surfaces are generally parallel to one another.

4. The apparatus of claim 1 further including first and second inwardly-facing opposed abutments respectively arranged above said first and second coupler-supporting surfaces and spaced laterally outwardly from said first and second guide surfaces for preventing such a ball coupler from moving laterally outwardly across said coupler-supporting surfaces beyond said opposed abutments.

5. Apparatus adapted for attachment to a towing vehicle for coupling that vehicle to a vehicular trailer carrying a ball coupler of a predetermined lateral width and having a ball receptacle adapted for receiving a coupler ball and comprising: a generally-horizontal base member having a forward edge extending laterally between spaced side edges and adapted for supporting an upright coupler ball mounted thereon along a generally-vertical axis; first and second upright members joined to said base member and respectively extended upwardly from said side edges for defining first and second inwardly-facing opposed guide surfaces respectively spaced outwardly from said vertical axis a selected lateral distance greater than half of said predetermined lateral width but less than said predetermined lateral width for cooperatively guiding such a ball coupler downwardly onto a coupler ball mounted on said base member; first and second generally-horizontal members respectively joined to said first and second upright members and respectively extended outwardly from said guide surfaces for defining upwardly-facing coupler-supporting surfaces adapted for slidably supporting such a ball coupler at an elevation above the top of a coupler ball mounted on said base member; and a third upright member secured between said first and second horizontal members and extending upwardly above said coupler-supporting surfaces for defining a rearwardly-facing generally-vertical coupler-positioning surface spaced ahead of said vertical axis a sufficient distance for contacting the nose of such a ball coupler and preventing the ball receptacle thereof from advancing forwardly in relation to a coupler ball mounted on said base member.

6. The apparatus of claim 5 wherein said third upright member is comprised of a plurality of laterally-spaced upright bars, and at least one generally-horizontal bar extending across and respectively joined to said upright bars for defining said coupler-positioning surface.

7. The apparatus of claim 5 further including first and second opposed stops respectively mounted adjacent to the outward edges of said first and second horizontal members for preventing such a ball coupler from moving laterally outwardly across said coupler-supporting surfaces beyond said opposed stops.

8. The apparatus of claim 5 further including a fourth upright member cooperatively arranged between said first and second upright members and extended downwardly below said third upright member toward said base member for guiding the nose of such a ball coupler being moved downwardly onto a coupler ball mounted on said base member.

9. The apparatus of claim 8 further including first and second opposed stops respectively mounted adjacent to the outward edges of said first and second horizontal members for preventing such a ball coupler from moving laterally outwardly across said coupler-supporting surfaces beyond said opposed stops.

10. The apparatus of claim 9 wherein said third upright member is comprised of a plurality of laterally-spaced upright bars, and at least one generally-horizontal bar extending across and respectively joined to said upright bars for defining said coupler-positioning surface.

11. The apparatus of claim 5 wherein said third upright member defines at least the intermediate portion of the rear vertical face of a vehicle bumper; and further including means adapted to securing said members to such a vehicle bumper.

12. The apparatus of claim 11 wherein said opposed guide surfaces are substantially parallel to one another.

13. The apparatus of claim 11 wherein said first and second upright members are substantially parallel to one another so that said opposed guide surfaces are defined by the opposed parallel faces of said first and second upright members.

14. The apparatus of claim 5 wherein said first and second guide surfaces are generally parallel to one another.

* * * * *